(12) United States Patent
Halverson et al.

(10) Patent No.: US 12,571,691 B2
(45) Date of Patent: Mar. 10, 2026

(54) SENSOR DEVICE FOR FLUID FITTING

(71) Applicant: LenLok Holdings, LLC, Willoughby, OH (US)

(72) Inventors: Andrew Halverson, Solon, OH (US); Mark Leopold, Solon, OH (US); Mark Timieski, Solon, OH (US); Matt Trowbridge, Solon, OH (US); Vance Farren, Solon, OH (US); William H. Lennon, Hunting Valley, OH (US); Mark John Sindelar, Shaker Heights, OH (US)

(73) Assignee: LENLOK HOLDINGS LLC, Willoughby, OH (US)

( * ) Notice: Subject to any disclaimer, the term of this patent is extended or adjusted under 35 U.S.C. 154(b) by 601 days.

(21) Appl. No.: 18/068,789

(22) Filed: Dec. 20, 2022

(65) Prior Publication Data

US 2023/0204439 A1      Jun. 29, 2023

Related U.S. Application Data

(60) Provisional application No. 63/266,108, filed on Dec. 29, 2021.

(51) Int. Cl.
G01L 1/22          (2006.01)
H04W 4/80          (2018.01)
(52) U.S. Cl.
CPC .......... G01L 1/2218 (2013.01); G01L 1/2287 (2013.01); H04W 4/80 (2018.02)
(58) Field of Classification Search
CPC ....... H01C 10/00; H01C 10/12; G01L 1/2287; G01L 1/2218
See application file for complete search history.

(56) References Cited

U.S. PATENT DOCUMENTS 4,290,311 A * 9/1981 Brewer ................. G01L 9/0002
                                                    73/730
4,793,189 A * 12/1988 Dell'Orto ............. G01L 1/2218
                                                    73/775
(Continued)

FOREIGN PATENT DOCUMENTS

CN          113574355 A      10/2021
DE      102019112422      * 11/2020   ............. G01L 5/221
(Continued)

OTHER PUBLICATIONS

DE-102019112422 translation (Year: 2020).*
(Continued)

*Primary Examiner* — Kyung S Lee
(74) *Attorney, Agent, or Firm* — Chrisman Gallo Tochtrop LLC

(57)          ABSTRACT

A sensor device is provided for attachment to a surface of a fluid fitting, including a sensor portion comprising a sensor configured for detecting a physical parameter, a flexible circuit portion comprising a flexible circuit board and one or more circuit components supported by the flexible circuit board, and a rigid circuit portion comprising a rigid circuit board and one or more other circuit components by the circuit board. The sensor portion, flexible circuit portion, and rigid circuit portion are operatively coupled together and adapted to be affixed to said surface of said fluid fitting. In one example, a strain sensor is used. In another example, the fluid fitting comprises a coupling body defining a bore for receiving said fluid element therein. A ring is configured to fit over at least one end of the coupling body for mechanically attaching the coupling body to said fluid element.

18 Claims, 7 Drawing Sheets

(56) References Cited

U.S. PATENT DOCUMENTS

| | | | |
|---|---|---|---|
| 5,110,163 | A | 5/1992 | Benson et al. |
| 5,305,510 | A | 4/1994 | Croft et al. |
| 5,709,418 | A | 1/1998 | Benson et al. |
| 6,131,964 | A | 10/2000 | Sareshwala |
| 6,607,136 | B1 | 8/2003 | Atsmon et al. |
| 6,692,040 | B1 | 2/2004 | McKay et al. |
| 6,834,556 | B2 | 12/2004 | Cain et al. |
| 7,090,030 | B2 | 8/2006 | Miller |
| 7,158,034 | B2 | 1/2007 | Corbett, Jr. |
| 7,575,257 | B2 | 8/2009 | McKay |
| 7,616,119 | B2 | 11/2009 | Corbett, Jr. |
| 8,004,414 | B2 | 8/2011 | Angell et al. |
| 8,393,646 | B2 | 3/2013 | Galle et al. |
| 8,439,404 | B2 | 5/2013 | Anton et al. |
| D712,769 | S | 9/2014 | Betsinger |
| 8,870,237 | B2 * | 10/2014 | Sindelar ............... F16L 13/146 |
| | | | 285/382.7 |
| 9,010,810 | B2 | 4/2015 | Anton et al. |
| 9,378,448 | B2 | 6/2016 | Ching et al. |
| 9,400,070 | B2 | 7/2016 | Anton et al. |
| 10,223,556 | B2 | 3/2019 | Ching et al. |
| 10,374,266 | B2 * | 8/2019 | Mensah-Brown ...... B60L 58/20 |
| 10,663,093 | B2 * | 5/2020 | Lennon ................ F16L 13/146 |
| 2006/0186666 | A1 | 8/2006 | McKay |
| 2006/0202821 | A1 | 9/2006 | Cohen |
| 2006/0250245 | A1 | 11/2006 | Forster |
| 2007/0276201 | A1 | 11/2007 | Lee et al. |
| 2008/0252459 | A1 | 10/2008 | Butler et al. |
| 2011/0133759 | A1 | 6/2011 | Chamberlin |
| 2011/0163536 | A1 | 7/2011 | Sindelar |
| 2011/0181399 | A1 | 7/2011 | Pollack et al. |
| 2011/0287713 | A1 | 11/2011 | Pollack et al. |
| 2012/0007607 | A1 | 1/2012 | Lowe |
| 2012/0126008 | A1 | 5/2012 | Binmore |
| 2013/0056538 | A1 | 3/2013 | Binmore |
| 2014/0000386 | A1 | 1/2014 | Malhan et al. |
| 2014/0360279 | A1 | 12/2014 | Jenkins |
| 2015/0054621 | A1 | 2/2015 | Lin et al. |
| 2015/0083810 | A1 | 3/2015 | Ching et al. |
| 2015/0139715 | A1 | 5/2015 | Exner et al. |
| 2015/0252922 | A1 * | 9/2015 | Anton .................... G01D 21/00 |
| | | | 285/93 |
| 2016/0273687 | A1 * | 9/2016 | Rubinski ................... G01L 5/24 |
| 2017/0089496 | A1 | 3/2017 | Lennon |
| 2019/0095769 | A1 | 3/2019 | Lektomiller |
| 2019/0301898 | A1 | 10/2019 | Jeno et al. |
| 2019/0339141 | A1 | 11/2019 | Gisby et al. |
| 2020/0100363 | A1 | 3/2020 | Kami et al. |
| 2022/0212719 | A1 * | 7/2022 | Lindenmayr .......... G01L 5/221 |

FOREIGN PATENT DOCUMENTS

| | | | |
|---|---|---|---|
| EP | 2851649 | A1 | 4/2013 |
| EP | 2 921 242 | A1 | 9/2015 |
| JP | 2003-302332 | A | 10/2003 |
| JP | 2018-159581 | A | 10/2018 |
| RU | 2 269 055 | C2 | 1/2006 |
| WO | 02/25161 | A1 | 3/2002 |
| WO | 2008/005547 | A2 | 1/2008 |
| WO | 2009/122166 | A2 | 10/2009 |
| WO | 2013/116087 | A1 | 8/2013 |
| WO | 2013/168720 | A1 | 11/2013 |
| WO | 2015/099763 | A1 | 7/2015 |

OTHER PUBLICATIONS

Maxwell, et al.; "GMC 2013: Piping Misalignment and Vibration Related Fatigue Failures;" www.BetaMachinery.com; Dated Nov. 1, 2013; pp. 1-10.

Swedberg; "Campbell Uses RFID Sensor Tags to Test Cooking Equipment;" RFID Journal; Dated Jun. 5, 2015; pp. 1-2.

International Search Report and Written Opinion from Corresponding Application No. PCT/US2016/053324; Dated Dec. 22, 2016.

Extended European Search Report dated Aug. 21, 2019 for corresponding European Application No. 16849693.3.

International Search Report for corresponding International Application No. PCT/US2022/053495 mailed Apr. 28, 2023.

Written Opinion for corresponding International Application No. PCT/US2022/053495 dated Apr. 28, 2023.

* cited by examiner

SENSOR DEVICE FOR FLUID FITTING

CROSS-REFERENCE TO RELATED APPLICATIONS

This application claims the benefit of U.S. provisional application Ser. No. 63/266,108 filed Dec. 29, 2021, the contents of which are incorporated by reference.

FIELD OF THE INVENTION

The present disclosure relates to a sensor device for a fluid fitting and more particularly, a sensor device having a rigid circuit portion and flexible antenna portion.

BACKGROUND OF THE INVENTION

Generally, one type of fitting for fluid elements, such as tubes or pipes, includes a connector body that fits loosely over the fluid element and a drive ring which compresses and/or physically deforms the connector body against the outside surface of the fluid element to provide one or more seals and to provide a strong mechanical connection. In some examples, one or more sensor devices can be attached to a curved surface of the fitting to sense one or more physical parameters of the fitting and/or fluid element. The sensed parameter(s) can provide useful information about the state of the fluid fitting at the time of installation upon the pipe, as well as continuing information over the useful lifetime of the fitting. However, the curved nature of the surface to which each sensor attaches can make it difficult to secure flat, rigid portions of the sensor device to the surface.

BRIEF SUMMARY OF THE INVENTION

The following presents a simplified summary of example embodiments of the invention. This summary is not intended to identify critical elements or to delineate the scope of the invention.

In accordance with one aspect, a sensor device for attachment to a surface of a fluid fitting, comprises a sensor portion comprising a sensor configured for detecting a physical parameter, a flexible circuit portion comprising a flexible circuit board and one or more circuit components supported by the flexible circuit board, and a rigid circuit portion comprising a rigid circuit board and one or more other circuit components by the circuit board. The sensor portion, flexible circuit portion, and rigid circuit portion are operatively coupled together and adapted to be affixed to said surface of said fluid fitting.

In another aspect, the one or more circuit components of the flexible circuit portion comprises an antenna. The antenna is an RFID antenna.

In another aspect, the one or more circuit components of the rigid circuit portion comprises RFID energy harvesting circuitry. The RFID energy harvesting circuitry includes an RFID transponder, a charge storage unit, and a DC/DC boost converter.

In another aspect, the one or more circuit components of the rigid circuit portion further comprises a Bluetooth® antenna (i.e., an antenna using radio waves in the 2.4 GHz frequency band to transmit data). The rigid circuit portion comprises a single microchip that includes the RFID energy harvesting circuitry and a microprocessor.

In another aspect, the sensor comprises a strain gauge.

In another aspect, the flexible circuit board comprises a fixed end that is fixed to the rigid circuit board, and a free end that is movable relative to the rigid circuit board. A carrier has a first side and a second side opposite to the first side, the first side having a curvature and the second side being substantially flat, wherein the rigid circuit board is affixed directly to the second side of the carrier.

In yet another aspect, an assembly comprises a fluid fitting for mechanical attachment to a fluid element. The fluid fitting comprises a coupling body defining a bore for receiving said fluid element therein, the coupling body comprising a sleeve portion and a tooth that extends radially inward from the sleeve portion for engaging said fluid element. A ring is configured to fit over at least one end of the coupling body for mechanically attaching the coupling body to said fluid element, wherein when the ring is installed on the at least one end of the coupling body via force with the fluid element received in the bore, the ring applies a compressive force to the coupling body sufficient to cause permanent deformation of the coupling body such that the tooth of the coupling body bites into said fluid element to thereby attach the coupling body to said fluid element in a non-leaking manner. A sensor device is affixed to a surface of the coupling body or the ring. The sensor device comprises a sensor portion comprising a sensor configured for detecting a physical parameter, a flexible circuit portion comprising a flexible circuit board and one or more circuit components supported by the flexible circuit board, and a rigid circuit portion comprising a rigid circuit board and one or more other circuit components by the circuit board.

The sensor portion, flexible circuit portion, and rigid circuit portion are operatively coupled together.

In another aspect, the sensor is located such that when the ring is installed on the at least one end of the coupling body, the sensor is in radial alignment with the tooth. The surface is an exterior surface of the drive ring.

In another aspect, the flexible circuit board is affixed directly to the surface of the coupling body or ring. A casing is provided that at least partially covers the sensor device.

In another aspect, the sensor device further comprises a carrier having a fitting side and a circuit board side opposite to the fitting side, the fitting side having a curvature that substantially matches a curvature of the surface of the coupling body or ring, and the circuit board side being substantially flat.

In another aspect, the surface of the coupling body or ring comprises a curved portion and a substantially flat portion, the sensor of the sensor device is affixed directly to the curved portion of the surface, and the rigid circuit board of the sensor device is affixed directly to the substantially flat portion of the surface.

In another aspect, the rigid circuit board comprises a plurality of circuit boards that are operatively connected by one or more leads.

In another aspect, a band assembly circumscribes the fluid fitting, and the band assembly having a carrier and at least one strap coupled to the carrier. The carrier includes a fitting side that faces the fluid fitting, and a circuit board side opposite to the fitting side that faces and supports the rigid circuit board of the sensor device.

In another aspect, the fitting side of the carrier has a curvature that substantially matches a curvature of the surface of the coupling body or ring.

BRIEF DESCRIPTION OF THE DRAWINGS

The above and other features, aspects, and advantages of the present application are better understood when the following detailed description of the present application is read with reference to the accompanying drawings, in which.

DETAILED DESCRIPTION

Figure 1:
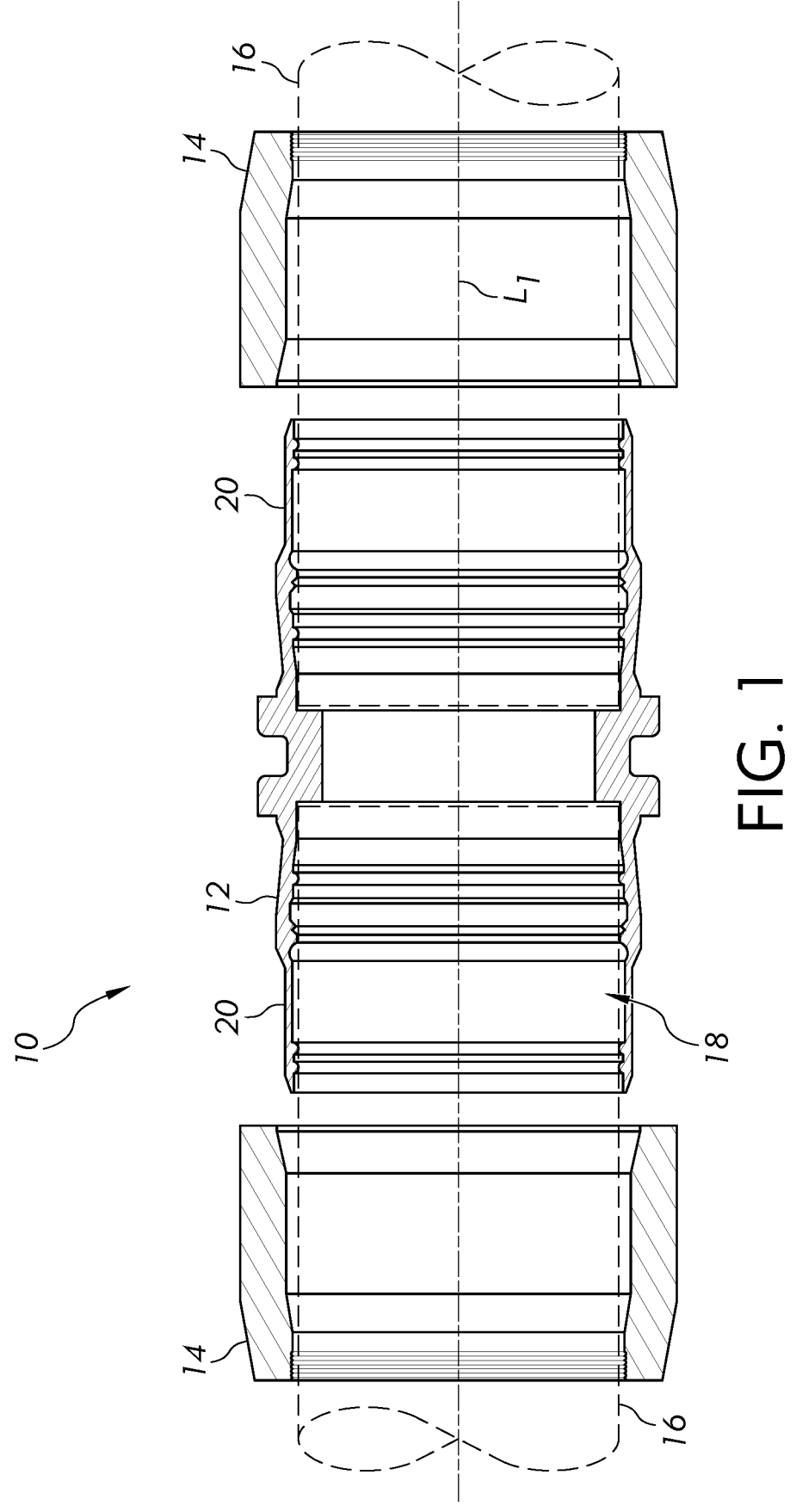
FIG. 1 is a cross-sectional view of an example fluid fitting.

The following is a detailed description of illustrative embodiments of the present application. As these embodiments of the present application are described with reference to the aforementioned drawings, various modifications or adaptations of the methods and or specific structures described may become apparent to those skilled in the art. All such modifications, adaptations, or variations that rely upon the teachings of the present application, and through which these teachings have advanced the art, are considered to be within the spirit and scope of the present application. Hence, these descriptions and drawings are not to be considered in a limiting sense as it is understood that the present application is in no way limited to the embodiments illustrated. Moreover, certain terminology is used herein for convenience only and is not to be taken as a limitation. Still further, in the drawings, the same reference numerals are employed for designating the same elements.

Herein, the terms "generally", "substantially", and variations thereof are intended to note that the described features are equal or approximately equal to a value or characteristic, as desired, reflecting tolerances, conversion factors, rounding off, measurement error and the like, and other factors. For example, a "substantially flat" surface is intended to denote a surface that is flat or approximately flat. Moreover, the terms "generally", "substantially", and variations thereof can denote values that are within about 10% of exact, for example within about 5% of exact, or within about 2% of exact. When the terms "generally", "substantially", and variations thereof are used in describing a value or characteristic, the disclosure should be understood to include the exact value or characteristic being referred to.

It is noted that the terms "generally", "substantially", and variations thereof may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Figure 2:
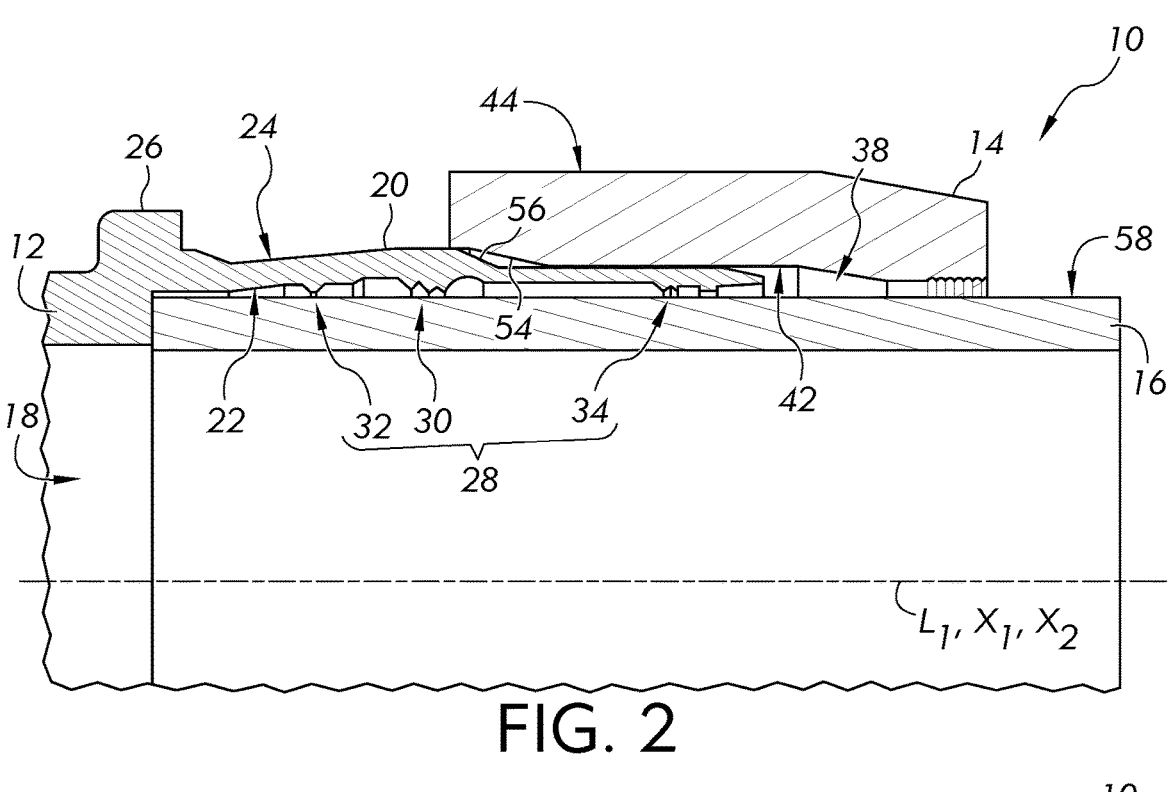
FIG. 2 is a detailed cross-sectional view of the fitting in a pre-installed configuration.
Figure 3:
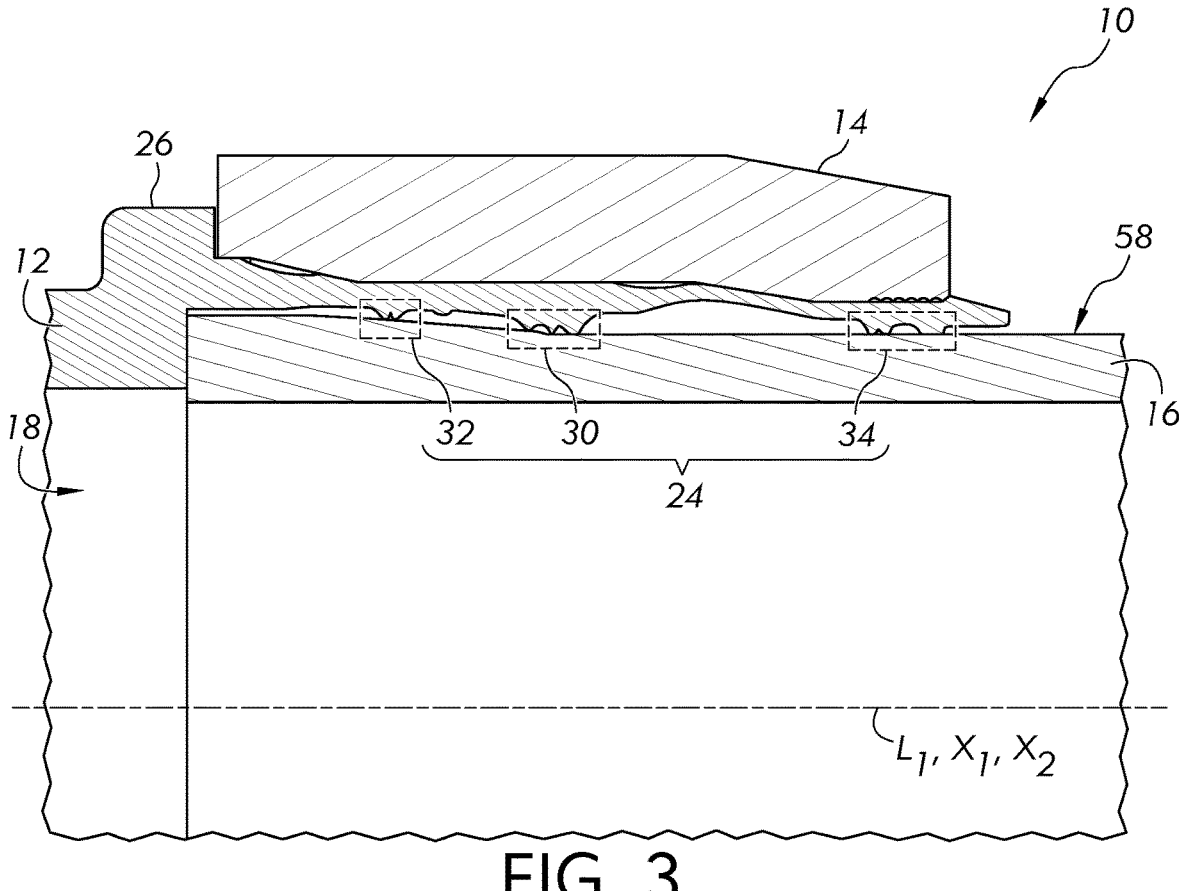
FIG. 3 is another detailed cross-sectional view of the fitting in an installed configuration.

Turning to FIG. 1-3, an example fitting 10 is illustrated that can be connected to two or more fluid elements. For the purposes of this disclosure, a "fluid element" refers to a pipe, tube, fitting, or any other element that is configured to convey, deliver, and/or receive fluid. Moreover, a "fitting" refers to any element that can be connected to two or more fluid elements to fluidly couple the two or more fluid elements together via the fitting.

FIGS. 1-3 show cross-sectional views of the fitting 10 taken along a plane that is parallel to and contains a longitudinal axis Li. The components of the fitting 10 as arranged in FIGS. 1-3 are generally symmetrical about the longitudinal axis Li such that they extend completely around the longitudinal axis Li in a symmetrical manner. FIG. 1 shows the components of the fitting 10 generally aligned along the longitudinal axis Li. Meanwhile, FIGS. 2 & 3 respectively show one side of the fitting 10 (i.e., the right side as viewed in FIG. 1) in a pre-installed configuration and an installed configuration. It is understood that the opposite side of the fitting 10 (i.e., the left side as viewed in FIG. 1) can comprise similar pre-installed and installed configurations that are mirrored along the longitudinal axis Li.

The fitting 10 in the present example includes a coupling body 12 and two drive rings 14 (sometimes referred to as "swage rings") that can be slid over the coupling body 12 to join a pair of pipe bodies 16 to the fitting 10, as discussed further below. The pipes 16 can be thin walled or thick walled pipes, such as those ranging in size from ¼" NPS to 4" NPS. However, other pipe sizes may also derive a benefit from the example fitting 10. Moreover, fitting 10 can be similarly connected to other types of fluid elements such as flanges, tees, and other fittings.

As shown in FIGS. 2 & 3, the coupling body 12 defines a bore 18 that extends through the coupling body 12 and has a central axis $X_1$. The coupling body 12 has an interior surface 22 that faces the bore 18 and defines an interior profile of the coupling body 12, and an exterior surface 24 that faces away from the bore 18 and defines an exterior profile of the coupling body 12. Moreover, the coupling body 12 includes a sleeve portion 20, a flange portion 26, and a seal portion 28 having a main seal 30, an inboard seal 32, and an outboard seal 34. Each seal 30, 32, 34 comprises one or more teeth that extend radially inward from the sleeve portion 20. However, it is contemplated that the seal portion 28 could include other numbers and/or arrangements of seals.

The drive ring 14 is similarly an open-center body defining a bore 38 that extends through the drive ring 14 and defines a central axis $X_2$. Moreover, the drive ring 14 includes an interior surface 42 that faces the bore 38 and defines an interior profile of the drive ring 14, and an exterior surface 44 that faces away from the bore 38 and defines an exterior profile of the drive ring 14.

The coupling body 12 and drive ring 14 can be initially assembled in the pre-installed configuration shown in FIG. 2. Specifically, the drive ring 14 can be arranged over the end of the coupling body 12 such that the central axes $X_1$, $X_2$ of the coupling body 12 and drive ring 14 are collinear with the longitudinal axis Li and the coupling body 12 is arranged within the bore 38 of the drive ring 14. In this configuration, a ramped-up section 54 of the drive ring 14 will be adjacent, but slightly spaced relative to, a land section 56 of the coupling body 12. Through an interference fit, the drive ring 14 can be maintained on the coupling body 12 in the pre-installed configuration and shipped to customers, which facilitates ease of use and installation by the ultimate end-users.

To install the fitting 10 onto a pipe 16, the pipe 16 can be located within the bore 18 of the coupling body 12 while the fitting 10 is in its pre-installed configuration (FIG. 2). The drive ring 14 can then be forced axially along the longitudinal axis Li toward the flange portion 26 of the coupling body 12 until the fitting 10 assumes its installed configuration (FIG. 3). The drive ring 14 and coupling body 12 have a predetermined ratio of interference, such that axial movement of the drive ring 14 to the installed configuration causes the coupling body 12, drive ring 14, and pipe 16 to deform, thereby creating a mechanical connection of these elements with a metal-to-metal seal between the pipe 16 and coupling body 12.

More specifically, as the drive ring 14 is forced axially toward the flange portion 26, it applies a compressive force to the coupling body 12 that causes radial deformation of the body 12, forcing the tooth or teeth of its seals 30, 32, 34 to bite into the pipe 16. The coupling body 12 in turn compresses the pipe 16 first elastically (i.e., non-permanent) and then plastically (i.e., permanent). This compression is sufficiently high to plastically yield the pipe 16 under the sealing lands, forming a 360° circumferential, permanent, metal-to-metal seal between the pipe 16 and the coupling body 12. Simultaneous with the radial compression of the body 12 and the pipe 16, the drive ring 14 expands radially outward. This radial expansion of the drive ring 14 is elastic, and results in a small increase in the diameter of the drive ring 14.

Setting of a seal is considered complete (i.e., fully set) when the seal's tooth or teeth are completely forced into deforming contact with the pipe 16 (e.g., when an exterior surface 58 of the pipe 16 immediately opposite the seals 30, 32, 34 has no further radial movement as a result of being forced inward by a particular section of the drive ring 14). Alternatively, full setting of a seal(s) can be defined as when the drive ring 14 has forced the tooth or teeth of the seal furthest into the pipe 16 or when an actuating taper of the drive ring 14 levels out to a diametrically constant cylindrical section as the drive ring 14 moves past the seal. The pipe 16 typically becomes strained beyond its elastic limit as the seals 30, 32, 34 continue to bite into the surface and the pipe 16 begins to plastically deform or move radially inwardly resulting in permanent deformation. The teeth of the seals 30, 32, 34 bite into and deform the exterior surface 58 of the pipe 16 and may themselves be somewhat deformed. This functions to fill any rough or irregular surface imperfections found on the outside of the pipe 16.

Once installed, the drive ring 14 will abut or engage the flange portion 26 (although it can be spaced from flange portion 26 in other examples). Moreover, because the drive ring 14 deforms elastically during installation such that it expands radially outward, the drive ring 14 will exert a continuous elastic force against the coupling body 12 and pipe 16 that is maintained after installation through the life of the fitting 10, thereby preventing release of the metal-to-metal seal between the pipe 16 and the coupling body 12.

Preferably, the stress within the drive ring 14 during installation never exceeds the elastic limit of the material forming the drive ring 14. In other words, the radial expansion which occurs is well within the elastic limits of the material such that an elastic force is maintained against the coupling body 12 and the pipe 16. For example, as the drive ring 14 is pushed onto the coupling body 12, the drive ring 14 can encounter a working stress of about 20,000 psi and elastically deform such that it expands by about 1.5 mil (1 mil equals 1 thousandth inch). With most suitable materials, plastic deformation can be measurable but minimal, and there can be an elastic balance between the pipe 16, coupling body 12, and drive ring 14 which tends to increase the reliability of the fitting 10. Moreover, due to the metallurgical nature of the metal connection via a swaging action, there is a significant change in the physical properties of the drive ring 14 that can be clearly measured by a suitable sensor.

The coupling body 12 and drive ring 14 described above extend symmetrically about their respective central axes $X_1$, $X_2$, such that their features extend circumferentially about and concentric to their associated central axis. In particular, their exterior surfaces 24, 44 curve about the central axes $X_1$, $X_2$ such that they maintain the cross-section profiles shown in FIGS. 1-3 completely around the central axes $X_1$, $X_2$. However, one or more features of the coupling body 12 and drive ring 14 may extend only partially about and/or asymmetric to their associated central axis. Indeed, in some examples, the coupling body 12 and/or drive ring 14 can be an irregular body with minimal or no symmetry about a central axis. For instance, the coupling body 12 can be a T-shaped or Y-shaped body having multiple legs that do not extend symmetric to a common axis.

Indeed, the fitting 10 can comprise a variety of other configurations for mechanical attachment to a fluid element without departing from the scope of this disclosure. Various example fittings with coupling bodies and drive rings are described in commonly owned U.S. Pat. Nos. 10,663,093; 8,870,237; 7,575,257; 6,692,040; 6,131,964; 5,709,418; 5,305,510; and 5,104,163, which are all expressly incorporated herein by reference in their entirety. Broadly speaking, the fitting 10 can comprise any configuration that enables the fitting 10 to fluidly couple two or more fluid elements, particularly wherein the fitting 10 has one or more curved surfaces (e.g., exterior surfaces 24, 44).

The terms "axial", "radial", and variations thereof have been used above in describing various features of the coupling body 12, drive ring 14, and pipe 16. It is to be appreciated that those terms as used above (and further below) are relative to the central axis of the element being described unless clearly indicated otherwise. For example, the terms "axial", "radial", and variations thereof when describing features of the coupling body 12 are relative to the coupling body's central axis $X_1$, when describing features of the drive ring 14 are relative to the drive ring's central axis $X_2$, and when describing features of the pipe 16 are relative to the pipe's central axis, unless clearly indicated otherwise. Moreover, it is understood that in configurations wherein the central axes of the coupling body 12, drive ring 14, and pipe 16 are collinear with each other and a common axis (see e.g., FIGS. 1-3), the terms "axial", "radial", and variations thereof when describing features of the coupling body 12, drive ring 14, and pipe 16 will similarly be relative to the common axis and all central axes of the coupling body 12, drive ring 14, and pipe 16.

In some examples, it may be desirable to attach a sensor device to a surface of the fitting 10 in order to monitor one or more parameters of the fitting 10. However, attaching a sensor device to a curved surface of the fitting 10 (e.g., one of exterior surfaces 24, 44) can be challenging, particularly if the sensor device includes flat and rigid components such as a rigid circuit board. Moreover, although flexible or curved circuit boards can be used for the sensor device, it can be difficult/expensive to manufacture such circuit boards, particularly if they support a large and/or complex number of circuit components. Accordingly, described below is a sensor device 100 that can be attached to a curved (or partially curved) surface of the fitting 10 and includes both rigid and flexible circuit portions to facilitate mounting of the sensor device while mitigating expense/difficulty of its manufacture.

Figure 4:
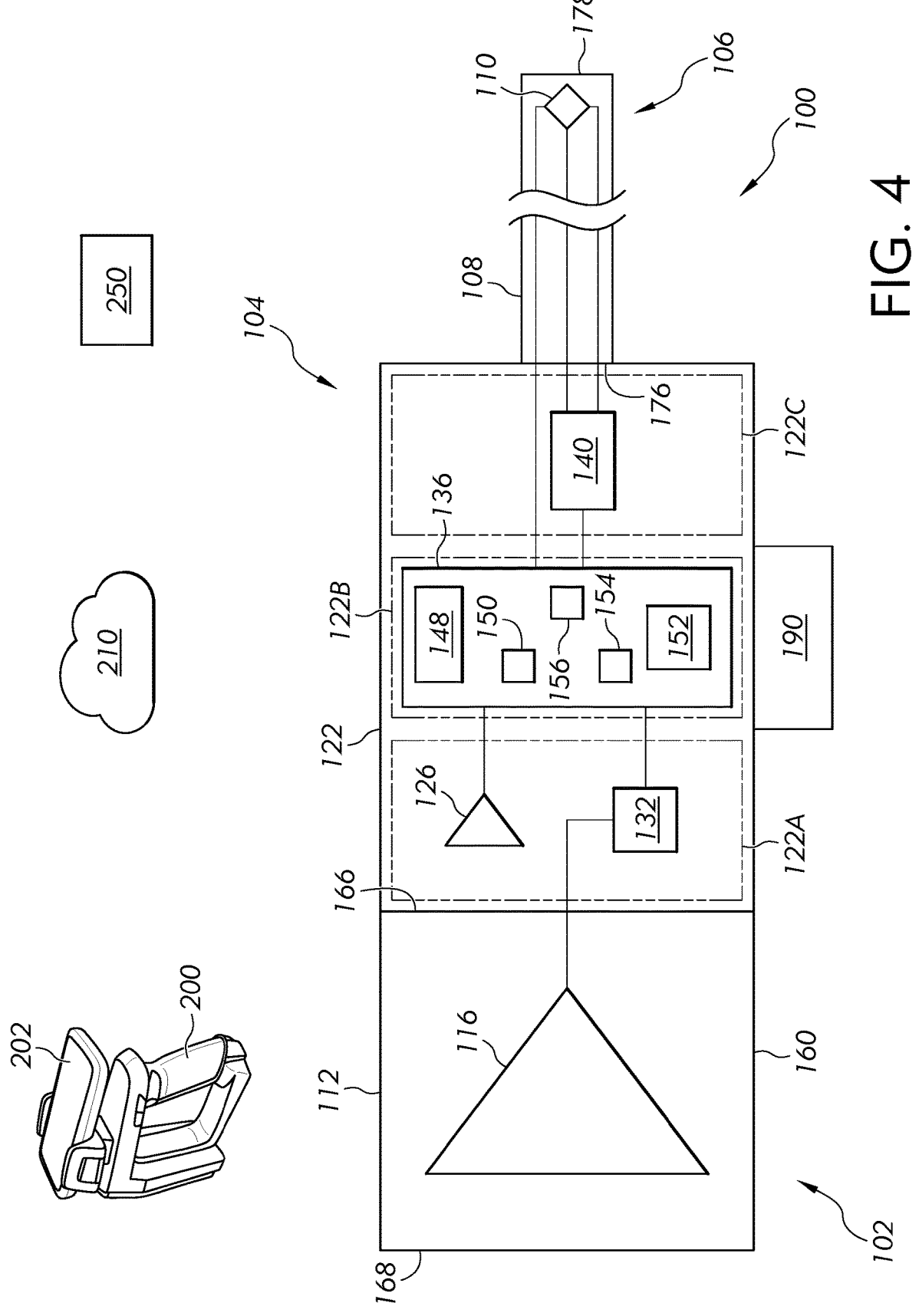
FIG. 4 is a schematic view of a sensor device for the fluid fitting.

More specifically, FIG. 4 schematically illustrates an example embodiment of the sensor device 100, which includes a flexible circuit portion 102, a rigid circuit portion 104, and a sensor portion 106. The sensor portion 106 has a flexible cable 108 and a sensor 110 supported by the cable 108 for detecting a parameter of the fitting 10. In the present example, the sensor 110 corresponds to a strain gauge, which can be directly attached to a surface of the fitting 10 to measure strain therein. Generally, a strain gauge measures the change in distance between two active spots, and so can be used to detect the changes in the drive ring 14 or coupling body 12 that result from installation of the fitting 10 upon the pipe 16. A strain gauge, sometimes referred to as a strain transducer, for metallic structures is typically a metal film resistance device. In one example, a strain transducer can be attached to a metal diaphragm that bends (strains) as a result of applied stress (resulting from material expansion or contraction) in the object being measured. These transducers typically produce a small electrical resistance change in response to the movement (strain) of the structure to which they are attached, which is often metal. Still, the strain sensor 110 could indicate sensed strain by a change in impedance, conductivity or other detectable characteristic or condition.

Various other types of strain sensors could be used for the sensor 110, including semiconductor strain gauges (sometimes called piezoresistors), capacitive strain gauges, etc. Moreover, the sensor 110 can be configured to detect other parameters of the fitting 10 or fluid flowing therethrough, such as, for example, acceleration, vibration, temperature, flow rate, fluid velocity, fluid pressure, etc. Still further, the sensor device 100 may include additional and/or alternative sensors 106 that are configured to detect additional and/or alternative properties. Indeed, the sensor device 100 can include any configuration of one or more sensors 106, wherein each sensor 110 is configured to detect a property of the fitting 10.

The flexible circuit portion 102 and rigid circuit portion 104 provide various circuitry for the sensor 110. Specifically, the flexible circuit portion 102 includes a flexible circuit board 112 that supports an RFID antenna 116. Moreover, the rigid circuit portion 104 has a rigid circuit board 122 that is divided into multiple sections, for example three sections:—an energy harvest section 122A that supports a Bluetooth® antenna 126 (i.e., an antenna using radio waves in the 2.4 GHz frequency band to transmit data) and impedance matching network 132; an energy storage and control section 122B that supports at least one microchip 136; and an interface section 122C that supports a sensor conditioning unit 140.

The microchip 136 of the energy storage and control section 122B includes a microprocessor 148 and a Bluetooth® transponder 150. Moreover, the microchip 136 further includes RFID energy harvesting circuitry 152, 154, 156 that, as discussed later herein, is operable to harvest, store, and supply energy during operation of the sensor device 100. In the present example, the RFID energy harvesting circuitry 152, 154, 156 includes an RFID transponder 152, a charge storage unit 154, and a DC/DC boost converter 156, although the microchip 136 may comprise additional or alternative RFID energy harvesting circuitry in other examples. In one embodiment, by using a single microchip 136 that combines the Bluetooth® transponder 150, the RFID energy harvesting circuitry 152, 154, 156, and the microprocessor 148, the overall size of the rigid circuit board 122 can be reduced (as compared to a sensor device wherein such devices are provided on separate chips). However, it is to be appreciated that other configurations utilizing multiple chips are possible without departing from the scope of the disclosure. In addition or as an alternative to the RFID energy harvesting system, it is further contemplated that the sensor device 100 could include other systems for energy harvesting. In one example, a thermo-electric generator (TEG) system could be utilized in locations where the sensor device 100 is attached to a pipe or tube that carries warm or hot fluid as a way to convert waste heat into additional electrical power. A thermo-electric generator refers to a solid-state device that converts temperature differences directly into electrical energy through a phenomenon called the Seebeck effect. The thermo-electric generator could be mounted variously to the pipe or tube that the fitting 10 is attached to, and can be electrically connected to the sensor device 100 by way of flexible wires or the like. Preferably, the thermo-electric generator would harvest energy from the waste heat of the tube or pipe at all suitable times, and store the generated electricity in a rechargeable battery (i.e., battery 190) or in one or more capacitors so that power is readily available for the sensor device 100 whenever needed. Still, it is also contemplated that a thermo-electric generator could be used with a design capable of generating sufficient power "on demand" for the sensor device 100. That is, the thermo-electric generator could be called to generate electricity only at or near the time that the sensor device 100 actually needs to the electrical power.

The flexible circuit board 112 of the sensor device 100 comprises a flexible substrate 160 made of polyimide, polyester (PET), or some other flexible material. Moreover, the RFID antenna 116 can be embedded within the substrate 160 or formed on a surface of the substrate 160 (e.g., via printing and/or deposition). Still further, the flexible circuit board 112 in some examples may include additional layers such as, for example, a copper conductive layer that is bonded to the flexible substrate 160.

Preferably, the flexible circuit board 112 can be flexed without damaging the RFID antenna 116 or the board 112 itself. For instance, the flexible circuit board 112 preferably has a minimum bending radius that is equal to or less than ten times its thickness. For the purpose of this disclosure, a "minimum bending radius" of a circuit board refers to the smallest radius the circuit board can be bent without material damage to the board itself or circuit components supported by the board. It is to be appreciated that various design elements such as antenna shape and substrate thickness can affect the minimum bending radius and can vary by embodiment.

The rigid circuit board 122, meanwhile, can include one or more rigid layers of insulating material or composite materials (e.g., FR-4, polyimide, Teflon®, etc.) that are stacked together, and one or more conductive elements (e.g., tracks, pads, traces, etc.) that are formed on, between, or through its layer(s). It is to be appreciated that the rigid circuit board 122 is relatively much stiffer than the flexible circuit board 112. For example, the rigid circuit board 122 may have a minimum bending radius that is at least fifty, one hundred, or two hundred times its thickness. Comparatively, this means that the rigid circuit board 122 may have a minimum bending radius that is at least five, ten, or twenty times the minimum bending radius of the flexible circuit board 112.

The portions 102, 104, 106 described above can be operatively coupled together to form the sensor device 100.

For instance, the substrate 160 of the flexible circuit portion 102 in the present embodiment has a fixed end 166 that is directly affixed to the rigid circuit board 122, and a free end 168 that is movable relative to the fixed end 166 due to the flexibility of the substrate 160. Moreover, the sensor device 100 includes a lead that electrically connects the RFID antenna 116 of the flexible circuit portion 102 to the impedance matching network 132 of the rigid circuit portion 104, thereby operatively coupling the circuit portions 102, 104. Meanwhile, the flexible cable 108 of the sensor portion 106 has a fixed end 176 that is directly affixed to the rigid circuit board 122, and a free end 178 opposite to the fixed end 176 that supports the sensor 110. Moreover, the sensor device 100 includes a plurality of leads that pass through the cable 108 and electrically connect the sensor 110 with the microchip 136 and sensor conditioning unit 140 of the rigid circuit portion 104, thereby operatively coupling the sensor portion 106 to the circuit portions 102, 104.

However, the portions 102, 104, 106 can be operatively coupled in other manners without departing from the scope of the disclosure. For instance, the flexible circuit portion 102 and sensor portion 106 may be spaced from the rigid circuit portion 104 and electrically connected thereto using leads that extend from the rigid circuit portion 104 to the flexible circuit portion 102 and sensor portion 106. In such examples, the portions 102, 104, 106 can include separable, mating connectors that enable the leads to be easily connected thereto (e.g., both mechanically and electrically) for quick plug and play. In other examples, the RFID antenna 116 of the flexible circuit portion 102 and the sensor 110 of the sensor portion 106 can be directly connected to the rigid circuit board 122 using, for example, solder.

It is further contemplated that the sensor device 100 could optionally contain an on-board internal battery 190. While described as an "on-board" and "internal" battery, it is to be understood that various design implementations can be used. For example, the battery 190 can be affixed directly on the rigid circuit board 122 or provided away from the circuit board 122 and connected thereto by flexible electrical wires. The use of an on-board battery 190 can help the sensor device 100 adapt to uses that consume relatively larger amounts of power. Further, an external battery can be easily replaced over time. In one example, the battery could be a lithium-based battery, although other conventional battery chemistries are also contemplated (i.e., zinc-carbon, nickel-cadmium, nickel metal hydride, etc).

The components of the sensor device 100 described above can function together so as to operate and, optionally, temporarily store information measured by the sensor 110. Moreover, the components can further function together so as to communicate wirelessly with an external device via Wifi, Bluetooth®, NFC, cellular (analog or digital, including all past or present iterations), or other similar techniques.

For instance, the sensor device 100 in the present example is configured to communicate wirelessly with an RFID reader 200, which in this embodiment is a handheld device that a smartphone 202 can be attached to. The reader 200 may, for example, utilize standard RFID protocols to operate at 915 MHz and have 50 channels, which variously supply energy based on factors such as the distance and relative location between the reader 200 and the sensor device 100. The reader 200 preferably includes Bluetooth® and/or Wifi data transponder(s), and can optionally include a high-frequency near field communication (HF-NFC) system, LoRa® (i.e., a long range, low power wireless communication system), cellular, satellite or other wireless communication system.

Furthermore, the reader 200 may be intermittently or continuously connected to one or more system supervisory devices 210 such as a PC or a datacenter. According to one possible implementation, the system supervisory device 210 may not be tied to a particular device or processor, but may be implemented with cloud computing (i.e., a remote networked compute) or other distributed processing services. The connection between the reader 200 and the system supervisory device 210 may be a wireless connection, such as Wi-fi, cellular, or Bluetooth®, or a hardwired connection, for example implemented on known IP protocols via ethernet or coaxial cable.

In one example operation embodiment, the reader 200 outputs RF interrogation signals at 915 MHz, which are picked up by the RFID antenna 116 of the sensor device 100 when the antenna 116 in appropriate proximity to the reader 200. The antenna 116 converts those signals to a usable alternating current (AC) voltage, which is fed to the impedance matching network 132 of the rigid circuit portion 104. The impedance matching network 132 may comprise a matched LC circuit comprising one or more inductors and one or more matching capacitors, so as to provide maximum power transfer. The impedance matching network 132 provides the matched input signal to the RFID transponder 152. However, in certain embodiments, the impedance matching network 132 may be omitted, so that the antenna 116 feeds AC voltage directly to the RFID transponder 152.

The RFID transponder 152 produces a rectified DC output having a relatively low voltage (e.g., less than 1.2 V DC) depending on the strength of the RF power signal received the by antenna 116. In order to obtain a more stable and continuous voltage supply, the rectified DC output is therefore supplied to the charge storage unit 154, which temporarily stores the harvested energy. The charge storage unit 154 may comprise a single capacitor or a bank of capacitors, with a combined output voltage. The bank of capacitors may be in the form of a capacitor network, and the capacitors may be connected to each other in parallel or in series.

Charge accumulates in the charge storage unit 154 until it is at or near a fully charged state. The charge storage unit 154 produces, at its output, a harvested voltage. Once the charge storage unit 154 has accumulated sufficient charge, the harvested voltage is delivered to the DC/DC boost converter 156. The DC/DC boost converter 156 takes the harvested voltage as an input and outputs a boosted voltage to the sensor 110, which in turn produces corresponding strain measurements VIN+, VIN− based on the boosted voltage and current strain in the object to which the sensor 110 is attached.

The strain measurements VIN+, VIN− produced by the sensor 110 are input to the sensor conditioning unit 154, which may amplify the measured values VIN+, VIN− and/or apply an offset to them. The sensor conditioning unit 154 produces an output that is read into the RFID transponder 152 as an A/D input. The RFID transponder 152 packages together a digitized value of the measured strain with an associated ID number for the sensor device 100 and transmits the packaged data to the reader 200 via the antenna 116. During the initial installation of the fitting 10 upon a pipe or tube, a first strain measurement can be taken that represents the strain of the drive ring 14 at the time of installation. This initial measurement value can be captured directly, and then future strain measurements can be compared against the initial measurement value to determine whether there are any changes in the drive ring 14 or coupling body 12 over time which may indicate changes in the seal between the fitting 10 and the pipe or tube. In one example, the initial measurement value can be captured directly and then future measurements can be compared against this value by obtaining a difference value (i.e., subtract one from the other). In another example, the initial measurement value can be captured directly and reported to the user, and thereafter, the initial measurement value can be calibrated to a zero value. Then, future measurements can be compared against the calibrated zero value to determine whether there are any changes in the drive ring 14 or coupling body 12 over time. Optionally, the sensor device 100 transmits the packaged data to the reader 200 using the Bluetooth® protocol via the Bluetooth® antenna 126. The reader 200 may temporarily store the packaged data and/or forward it directly to the system supervisory device 210, which can use the data to calculate the actual value of the sensed parameter. In some cases, the system supervisory device 210 may perform post-processing on the measurement data. The measurement data may also be stored in raw or processed form on the system supervisory device 210 for further data analysis and/or data compilation purposes.

Although referred to as a "reader" above, it is to be understood that in some embodiments the reader 200 may be used only to supply power to the sensor device 100. That is, the reader 200 may not "read" data via an RFID transducer system. Instead, the measurement data can be transmitted to another device (e.g., the smartphone 202 or system supervisory device 210) via the Bluetooth® antenna 126 of the sensor device 100. Moreover, in practice, the reader 200 may perform some of the functions described herein as belonging to the system supervisory device 210, and vice versa. Indeed, the reader 200 and system supervisory device 210 could in some cases be implemented as a single unit, or as more than the two units described, with functions associated with either one or both of these devices being distributed over two or more devices.

In some examples, the on-board battery 190 described above could be used together with (as a supplement to) the RFID energy-harvesting circuitry 152, 154, 156 so that the sensor device 100 can operate at some capacity when no RFID signal is present from which to harvest energy. In another embodiment, the on-board battery 190 could be used as the only power source for the sensor device 100. The use of an on-board battery provides several beneficial advantages. In one example, the constant source of electrical power enables the sensor device 100 to be constantly or periodically operating to take measurements of the fitting 10 and transmit those data measurements to a Bluetooth® receiver. It is contemplated that while the term "periodic" is used, this can mean either a fixed or non-fixed schedule. For example, the battery 190 can enable the sensor device 100 to take sensor readings once per hour, once per day, etc. Likewise, the battery 190 can enable the sensor device 100 to transmit the data on the same or on a different schedule. Furthermore, the schedule does not need to be fixed, but can vary based upon different parameters or can even be random. In yet another example, the battery 190 can be used in cooperation with the RFID reader 200 as a triggering mechanism. The on-board battery 190 could be used as the only power source for the sensor device 100, and the microchip 136 can be configured to enter a "sleep" mode when no strain readings are actively being taken. In the "sleep" mode, the microchip 136 can only utilize a very small amount of power from the battery 190 for the purpose of waiting for (i.e., sniffing) a particular RFID signal or pattern that will act as a trigger. Upon detecting the particular RFID signal or pattern, the microchip 136 "wakes up" and obtains a strain reading from eh strain sensor 110 and transmits that reading via the Bluetooth® antenna 126 either to the reader 200 or to the system supervisory device 210. After the reading is taken and transmitted, the microchip 136 will then re-enter the "sleep" mode and wait for (i.e., sniffing) the particular RFID signal or pattern that will act as the trigger. Using a system like this, the battery 190 can be used for a long period of time since the electrical draw is greatly reduced.

When the on-board battery 190 is present, a stationary Bluetooth® gateway device 250 can be located within the transmission range of the Bluetooth® antenna 126 so that the periodic data transmissions of the sensor device 100 can be captured and relayed to the system supervisory device 210. In this way, the sensor device 100 can automatically take periodic readings of the fitting 10 and transmit the data for remote capture and use, without requiring an end user to be physically present. Moreover, where multiple fittings 10 are located nearby each other, each fitting can have its own sensor device 100 attached thereto and the single Bluetooth® gateway device 250 can be used to capture the sensor data readings from all of the sensor devices and fittings. In this way, some or all fittings located within range of the single Bluetooth® gateway device 250 can have sensor data readings automatically captured and sent to the system supervisory devices 210.

It is to be appreciated that the sensor device 100 can be configured to communicate with additional or alternative devices without departing from the scope of the disclosure. Moreover, the circuitry and sensor of the device 100 can also vary by embodiment. For instance, other example circuitries for a sensor device 100 are described in U.S. Pat. Nos. 9,378,448, 10,663,093 and 10,657,431, which are expressly incorporated herein by reference in their entirety. Broadly speaking, the sensor device 100 can comprise any configuration having a flexible circuit portion, a rigid circuit portion, and a sensor portion, wherein the circuitry and sensor(s) of those portions are operatively connected to form a circuit assembly that is operable to measure a parameter of the fitting 10.

FIGS. 5-8 show various mounting configurations of the sensor device 100 described above. As shown in each figure, the sensor device 100 can be applied to a curved or partially-curved surface of the fitting 10 (e.g., the exterior surface 44 of the drive ring 14), such that the rigid circuit board 122 rests (directly or indirectly) against the surface. Meanwhile, the free ends 168, 178 of the flexible circuit board 112 and sensor cable 108 can be affixed to the surface 44 (e.g., using adhesive) such that the flexible circuit board 112 and sensor cable 108 exert tension on the rigid circuit board 122 and hold the rigid circuit board 122 in place against surface 44, thereby securing the sensor device 100 to the fitting 10.

As can be appreciated from the drawings, the flexibility of the circuit board 112 enables the sensor device 100 to better conform to the curvature of the surface 44, as compared to a similar device in which both circuit portions 102, 104 are provided by a common, rigid circuit board. However, as noted above, it can be difficult/expensive to manufacture sensor devices with flexible or curved circuit boards, particularly if the circuit board supports a large number of circuit components. Accordingly, the sensor device 100 mitigates this issue by having a flexible circuit board 112 that only supports a portion of the device's overall circuit components, while having a rigid circuit board 122 that supports other circuit components.

In particular, the antenna 116 of the sensor device 100 is typically easier to manufacture on a flexible circuit board than other circuitry. Moreover, the RFID antenna 116 can comprise a significant proportion of the sensor device's overall size. Thus, the antenna 116 is supported by the flexible circuit board 112 while other circuit components are supported by the rigid circuit board 122. As such, a significant proportion of the device 100 (i.e., the flexible circuit board 112) can be flexible but still relatively cheap/easy to manufacture since it does not support every circuit component of the device 100. However, as noted above, the sensor device 100 can comprise any configuration in which one or more circuit components are supported by the flexible circuit board 112 while one or more other circuit components are supported by the rigid circuit board 122.

Figure 5:
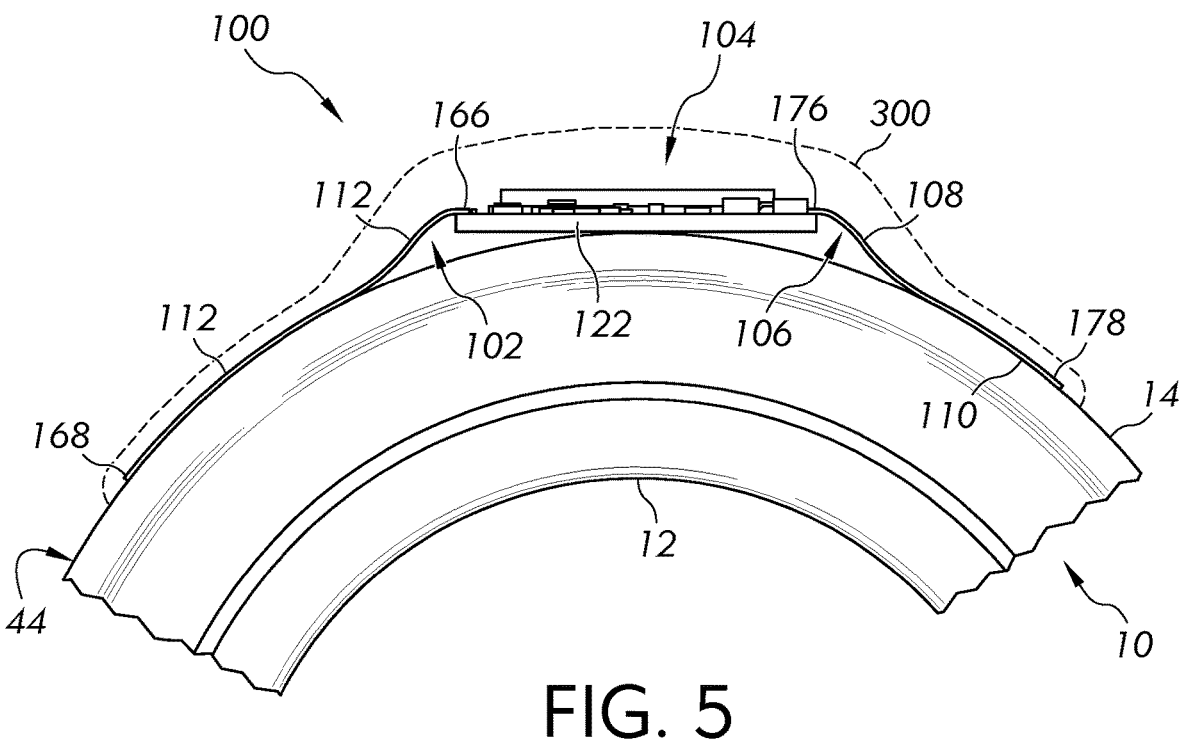
FIG. 5 is a schematic side view of a mounting configuration for the sensor device on the fluid fitting.
Figure 6:
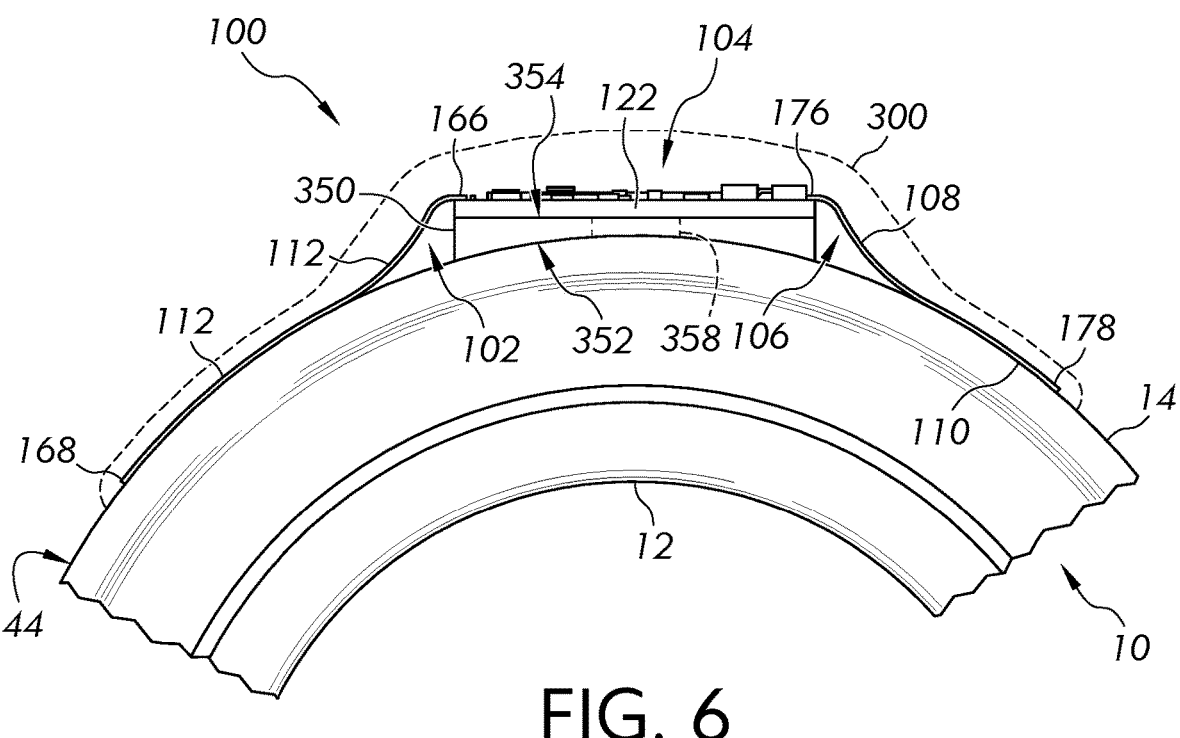
FIG. 6 is a schematic side view of another mounting configuration for the sensor device on the fluid fitting.
Figure 7:
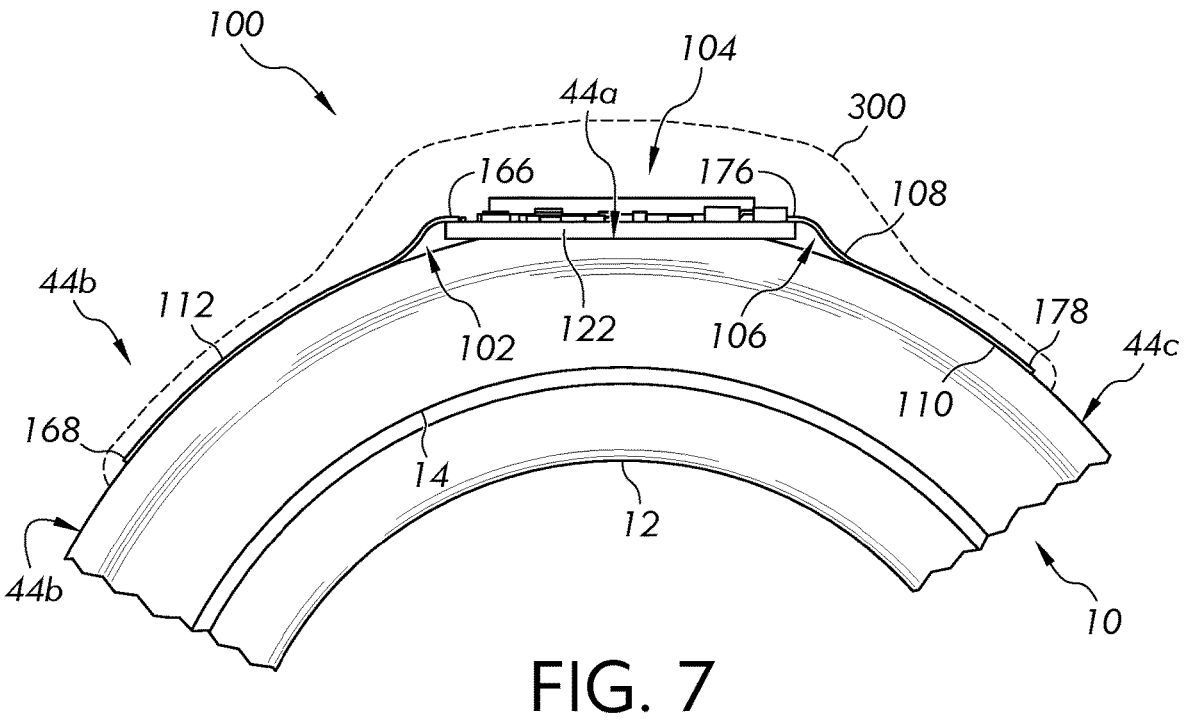
FIG. 7 is a schematic side view of yet another mounting configuration for the sensor device on the fluid fitting.
Figure 8:
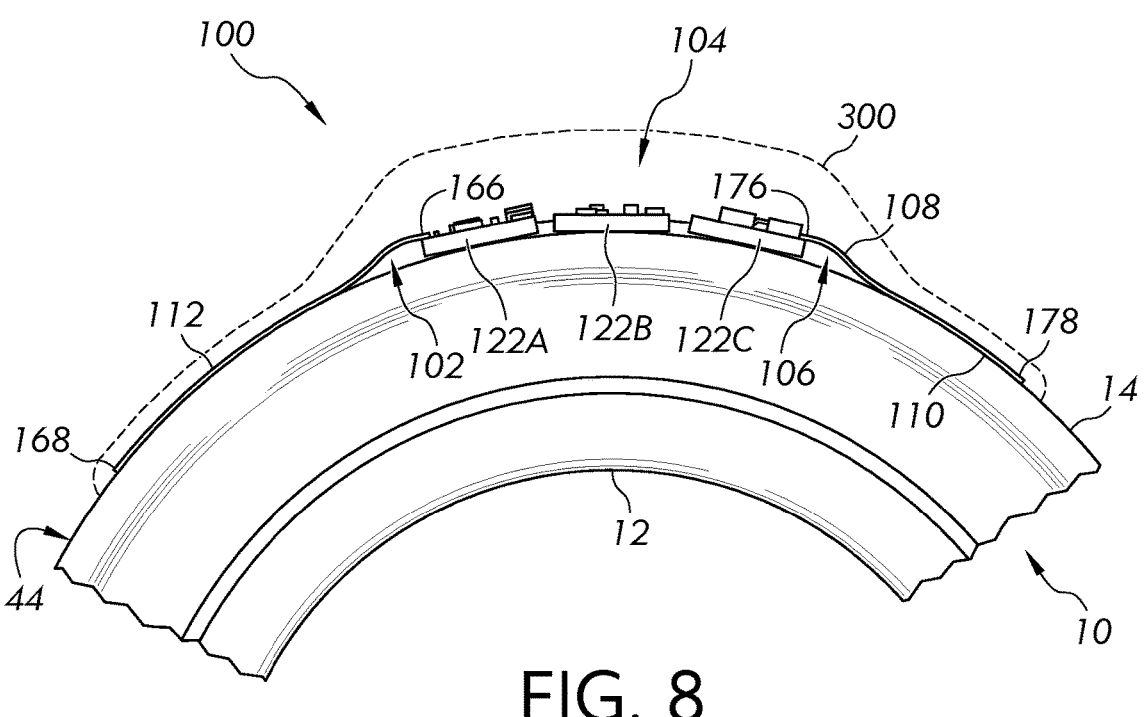
FIG. 8 is a schematic side view of still yet another mounting configuration for the sensor device on the fluid fitting.

As shown in FIG. 5, the sensor device 100 can be mounted such that the rigid circuit board 122 rests directly on the curved surface 44 of the drive ring 14, substantially tangent thereto. Alternatively, the sensor device 100 can include a carrier 350 (see FIG. 6), which can be interposed between the fitting 10 and the rigid circuit board 122. The carrier 350 has a fitting side 352 that can conform and be attached directly to the curved surface 44 of the fitting 10. That is, the fitting side 352 can have a curvature that substantially matches the curved surface 44. Moreover, the carrier 350 can have a circuit board side 354 that is flat and can support the rigid circuit board 122. The intermediate carrier 350 can provide additional stability to the rigid circuit board 122 by supporting a larger area underneath, as compared to the embodiment of FIG. 5 in which the rigid circuit board 122 is only supported at the contact area between the board 122 and surface 44.

Optionally, the carrier 350 in some examples can define a through hole 358 to provide direct access to between the rigid circuit board 122 and the fitting surface 44. In such examples, the sensor device 100 can exclude the flexible cable 108, and the sensor 110 can instead be arranged within the through hole 358 and attached to the fitting surface 44 directly below the rigid circuit board 122. Moreover, the sensor device 100 can include a lead within the through hole 358 that electrically connects the sensor 110 and rigid circuit board 122.

In other examples (see e.g., FIG. 7), the exterior surface 44 of the drive ring 14 (or some other surface of the fitting 10) can be partially curved such that it has a flat portion 44a and one or more curved portions 44b, 44c. The rigid circuit board 122 of the sensor device 100 can be directly affixed to and supported by the flat portion 44a, while the flexible circuit board 112 and sensor 110 can be directly affixed to the curved portion(s) 44b, 44c. This configuration can similarly provide added stability to the rigid circuit board 122 but without the carrier 350 described above.

Still further, the rigid circuit board 122 in some examples can be split into multiple rigid circuit boards (see e.g., FIG. 8), which are operatively connected by flexible electrical leads such that the boards can be angled or movable relative to each other. This maintains the use of rigid circuit boards for the circuit portion 104 of the sensor device 100 while achieving a similar effect to a flexible circuit board. In the illustrated example, the rigid circuit board 122 is split into three rigid circuit boards, which correspond to and comprise the portions 122A-C described above with reference to FIG. 4. Each of the portions 122A-C may rest directly on the curved surface 44 of the drive ring 14. However, the rigid circuit board 122 may be split into other numbers and configurations of circuit boards without departing from the scope of the disclosure.

In the mounting configurations shown in FIGS. 5-8, the sensor device 100 extends about a portion of the drive ring's circumference. However, the sensor device 100 can extend about the entire circumference in other examples. In such embodiments, the free ends 168, 178 of the flexible circuit board 112 and sensor cable 108 can be directly affixed to each other (rather than the surface 44 of the drive ring 14), such that the sensor device 100 forms a continuous loop that can be placed around the drive ring 14 to install the sensor device 100. Moreover, one or more portions of the sensor device 100 (e.g., the flexible circuit board 112 or sensor cable 108) can comprise an elastic material that is stretched when the sensor device 100 is placed around the drive ring 14, thereby generating a tension holds the sensor device 100 in place.

As a further option, a protective casing material 300 can be applied over the sensor device 100 to encase and isolate it from the external environment. For example, as shown in FIGS. 5-8, the protective casing material 300 can be applied over the sensor device 100 upon the exterior surface 44 of the drive ring 14. The protective casing material 300 is selected to be easily applied to the drive ring 14 and provide a thin coating that protects the underlying sensor device 100 from mechanical and environmental damage. Preferably, the protective casing material 300 does not significantly increase the radial thickness of the overall assembly. In various examples, the sensor device 100 and protective casing material 300 may be selected for usage in high temperature and/or high pressure environments and may advantageously provide readability, easy installation, and packaging that is resistant to mechanical and chemical stresses, even in harsh conditions such as heavy industrial, nuclear, offshore, and/or oil and gas environments. The casing material 300 is preferably also resistant to the stress/strain that occurs during installation of the fitting 10 upon the pipe. Where the sensor device 100 is attached to the pipe 16 and exposed to the fluid therein, it is also preferably that the protective casing material 300 seals the sensor device 100 from the fluid to inhibit contact therebetween.

The protective casing material 300 can be brushed, rolled or sprayed onto the sensor device 100 and the drive ring 14, although any suitable means for disposing a relatively uniform thin layer of the protective casing material 300 may be utilized. In one embodiment, the protective casing material 300 can be a urethane coating, although other materials may also be suitable such as nitrile, Viton® (i.e., fluoroelastomer), epoxy, etc. In other embodiments, the protective casing material 300 could be a flexible plastic substrate or the like with a pressure sensitive adhesive that is placed over the sensor device 100 in a covering manner. Of course, the protective casing material 300 can be radio-transparent to any RF signal to enable the usage of an RFID, Bluetooth®, Wifi, or cellular communication system. It may be advantageous to taper the deposition of the protective casing material 300 such that it is thickest about the circumference of the drive ring 14 directly covering the sensor device 100 and tapers out at the ends of the band of application to be relatively thinner. Moreover, although the casing material 300 will preferably cover the entire sensor device 100, there may be embodiments in which one or more portions of the sensor device 100 are exposed and not covered by the casing material 300. Alternatively, the protective casing material 300 can be provided as a rigid protective case, such as a plastic case, that is arranged in a covering relationship over the sensor device 100. Such a protective case can be removably attached to the sensor device 100 in various suitable manners, such as via mechanical fasteners, adhesive, or the like.

Figure 9:
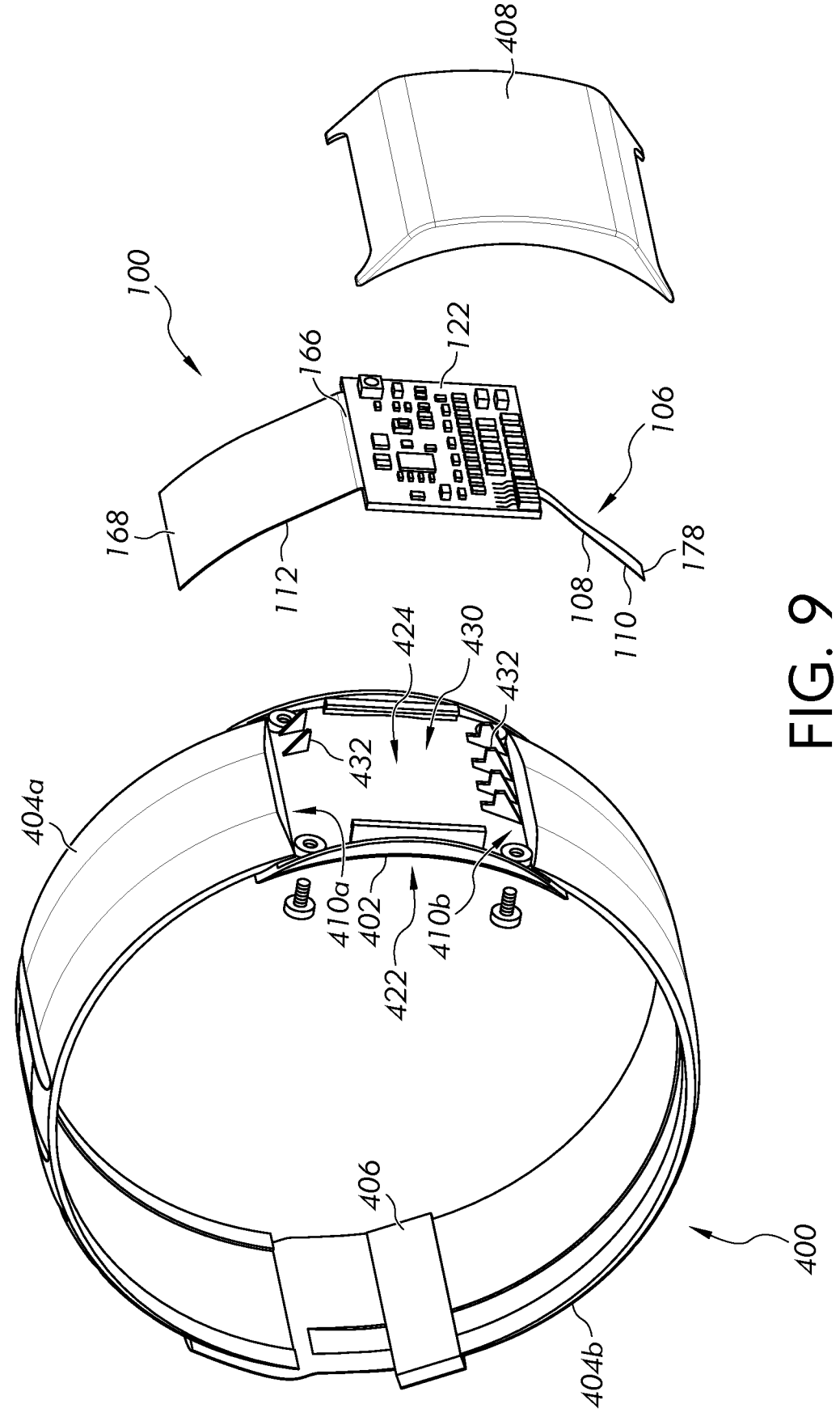
FIG. 9 is an exploded view of another mounting configuration for the sensor device on the fluid fitting.
Figure 10:
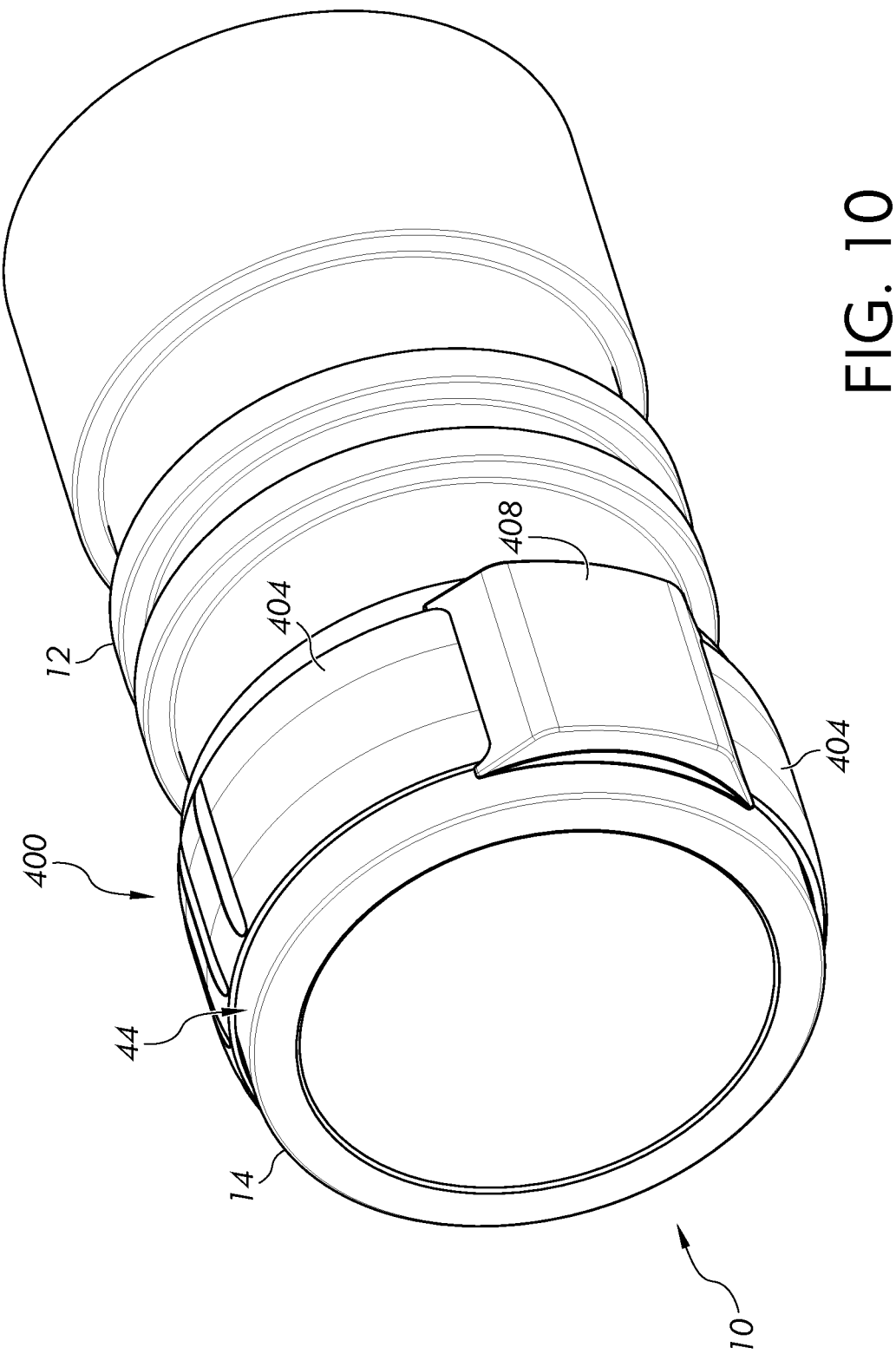
FIG. 10 is a perspective view of the sensor device in FIG. 9 when mounted to the fluid fitting.

FIGS. 9 & 10 show another mounting configuration wherein the sensor device 100 is installed using a band assembly 400 that is configured to wrap around the outer perimeter of the fitting 10. The band assembly 400 includes a carrier 402, a pair of flexible straps 404a, 404b, a clasp 406, and a cover 408. The straps 404a, 404b are coupled to opposite ends of the carrier 402, preferably in a pivotable manner, such that corresponding gaps 410a, 410b are formed between the straps 404a, 404b and the carrier 402. Moreover, the band assembly 400 is configurable to form a looped band that circumscribes and is secured to the drive ring 14 (or some other portion) of the fitting 10. In particular, the straps 404a, 404 of the band assembly 400 can be placed around the drive ring 14 and clasped together by the clasp 406 to form a looped band that circumscribes the drive ring 14, thereby securing the band assembly 400 to the fitting 10.

The carrier 402 of the band assembly 400 has a fitting side 422 that will face the fitting surface 44 when mounted, and a circuit board side 424 opposite to the fitting side 422. Moreover, the circuit board side 424 includes a surface 430 and a plurality of mounting elements (e.g., tabs) 432 extending from the surface 430 that are configured to accommodate and support the edges of the rigid circuit board 122. In the present example, the carrier 402 is flexible such that the fitting side 422 can be bent to substantially match a curvature of the fitting surface 44. However, the carrier 402 can be rigid in other examples, and the fitting side 422 can be formed to have a curvature that substantially matches the fitting surface 44. Moreover, in some examples, the rigid circuit board 122 can rest directly against the surface 430 of the circuit board side 424, which may be substantially flat.

The sensor device 100 can be mounted using the band assembly 400 by first placing its rigid circuit board 122 on the mounting tabs 432 of the carrier 402 (or directly against the surface 430 of the circuit board side 424). The sensor 110 and flexible circuit board 112 can then be fed through the gaps 410a, 410b defined between the straps 404a, 404b and carrier 402, and the sensor 110 can be affixed to the surface 44 of the drive ring 14. Moreover, the cover 408 can be removably attached to the carrier 402 (e.g., via a snap fit or other mechanical fasteners, such as screws) to cover the rigid circuit board 122 and hold it against the carrier 402. The straps 404a, 404b can then be clasped together as described above to secure the band assembly 400 and sensor device 100 to the fitting 10. Preferably, the cover 408 is at least partially protected against liquid or gas intrusion, for example by a labyrinth connection design and/or a seal, to thereby inhibit corrosion or environmental damage to the circuit board 122.

The straps 404a, 404b preferably comprise a material such as a flexible metal (e.g., steel) that can withstand high temperatures associated with the fitting 10. In such embodiments, the clasp 406 can comprise a tensioning mechanism that can be operated to clasp and apply tension to the straps 404a, 404b. However, the straps 404a, 404b may comprise other materials (e.g., rubber) without departing from the scope of the disclosure, particularly in embodiments wherein the fitting 10 maintains a relatively low temperature. Moreover, it is to be appreciated that the band assembly 400 can comprise other configurations that can be looped around the fitting 10 to install the sensor device 100. For instance, in one example, the band assembly 400 can comprise the carrier 402 and a single strap forming a continuous loop that can be placed around the fitting 10.

In the illustrated example, the sensor 110 and flexible circuit board 112 are fed through the gaps 410a, 410b defined between the straps 404a, 404b and carrier 402, such that the sensor 110 and flexible circuit board 112 are located between the straps 404a, 404b and fitting 10. This is particularly advantageous for the sensor 110 so it can be affixed directly to the surface 44 for measurement of strain therein. However, in other examples, the flexible circuit board 112 can be folded over the rigid circuit board 122 such that it is arranged between the rigid circuit board 122 and cover 408. In other words, the circuit board 112 can extend from its fixed end 166 toward the sensor portion 106, such that its rests on the rigid circuit board 122 just below the cover 408. This folded arrangement of the circuit board 112 can space it from the surface 44 of the fitting 10, which in some embodiments can reach high temperatures that can damage the flexible circuit 112. Thus, folding the flexible circuit board 112 as such can protect the board 112 from high temperatures of the fitting 10.

The sensor device 100 can be mounted at various locations along the fitting 10 using the mounting configurations described above. However, it is preferable for the sensor 110 to be located at a region that experiences relatively high strain at the installed configuration, or at potential failure points. In many cases, such a location can be found near or in radial alignment with one of the main seal 30, inboard seal 32, and/or outboard seal 34 on the inner diameter of the coupling body 12 (see FIGS. 1-3). For example, the physical strain in the material of the drive ring 14, due to its elastic expansion during installation, is relatively high in the position over the location of the main seal 30 because this is a location of high deformation of the coupling body 12 and pipe 16.

Thus, for each mounting configuration, the sensor 110 can be affixed directly to the exterior surface 44 of the drive ring 14 (e.g., via an adhesive) and located such that when the fitting 10 is in its installed configuration, the sensor 110 is generally in radial alignment with at least one of the seals 30, 32, 34, such as the main seal 30, relative to the longitudinal axis Li of the fitting 10. However, it is contemplated that the sensor 110 can be affixed to various other parts of the fitting 10, interior or exterior, including the body 12 or pipe 16.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A sensor device for attachment to a surface of a fluid fitting, comprising:
   a sensor portion comprising a sensor configured for detecting a physical parameter;
   a flexible circuit portion comprising a flexible circuit board and one or more circuit components supported by the flexible circuit board, wherein the one or more circuit components comprises an antenna; and
   a rigid circuit portion comprising a rigid circuit board and one or more other circuit components supported by the rigid circuit board, wherein the one or more other circuit components comprises energy harvesting circuitry,
   wherein the sensor portion, flexible circuit portion, and rigid circuit portion are operatively coupled together.

2. The sensor device of claim 1, wherein the antenna is an RFID antenna.

3. The sensor device of claim 2, wherein the energy harvesting circuitry comprises RFID energy harvesting circuitry.

4. The sensor device of claim 3, wherein the RFID energy harvesting circuitry includes an RFID transponder, a charge storage unit, and a DC/DC boost converter.

5. The sensor device of claim 3, wherein the rigid circuit portion comprises a single microchip that includes the RFID energy harvesting circuitry and a microprocessor.

6. The sensor device of claim 1, wherein the sensor comprises a strain gauge.

7. The sensor device of claim 1, wherein the flexible circuit board comprises a fixed end that is fixed to the rigid circuit board, and a free end that is movable relative to the rigid circuit board.

8. The sensor device of claim 1, further comprising a carrier having a first side and a second side opposite to the first side, the first side having a curvature and the second side being substantially flat, wherein the rigid circuit board is affixed directly to the second side of the carrier.

9. An assembly comprising:

the sensor device of claim 1, and a band assembly, the band assembly having a carrier and at least one strap coupled to the carrier, wherein the carrier includes a fitting side adapted to face the fluid fitting, and a circuit board side opposite to the fitting side that faces and supports the rigid circuit board of the sensor device.

10. An assembly comprising:

a fluid fitting for mechanical attachment to a fluid element, the fluid fitting comprising:

a coupling body defining a bore for receiving said fluid element therein, the coupling body comprising a sleeve portion and a tooth that extends radially inward from the sleeve portion for engaging said fluid element, and a ring configured to fit over at least one end of the coupling body for mechanically attaching the coupling body to said fluid element, wherein when the ring is installed on the at least one end of the coupling body via force with the fluid element received in the bore, the ring applies a compressive force to the coupling body sufficient to cause permanent deformation of the coupling body such that the tooth of the coupling body bites into said fluid element to thereby attach the coupling body to said fluid element in a non-leaking manner;

a sensor device affixed to a surface of the coupling body or the ring, the sensor device comprising:

a sensor portion comprising a sensor configured for detecting a physical parameter, a flexible circuit portion comprising a flexible circuit board and one or more circuit components supported by the flexible circuit board, and a rigid circuit portion comprising a rigid circuit board and one or more other circuit components supported by the rigid circuit board; and a band assembly that circumscribes the fluid fitting, the band assembly having a carrier and at least one strap coupled to the carrier, wherein the carrier includes a fitting side that faces the fluid fitting, and a circuit board side opposite to the fitting side that faces and supports the rigid circuit board of the sensor device, wherein the sensor portion, flexible circuit portion, and rigid circuit portion are operatively coupled together.

11. The assembly of claim 10, wherein the sensor is located such that when the ring is installed on the at least one end of the coupling body, the sensor is in radial alignment with the tooth.

12. The assembly of claim 10, wherein the surface is an exterior surface of the ring.

13. The assembly of claim 10, wherein the flexible circuit board is affixed directly to the surface of the coupling body or ring.

14. The assembly of claim 10, further comprising a casing that at least partially covers the sensor device.

15. The assembly of claim 10, wherein the fitting side of the carrier has a curvature that substantially matches a curvature of the surface of the coupling body or ring, and the circuit board side of the carrier is substantially flat.

16. The assembly of claim 10, wherein the rigid circuit board comprises a plurality of circuit boards that are operatively connected by one or more leads.

17. The assembly of claim 10, wherein the fitting side of the carrier has a curvature that substantially matches a curvature of the surface of the coupling body or ring.

18. An assembly comprising:

a fluid fitting for mechanical attachment to a fluid element, the fluid fitting comprising:

a coupling body defining a bore for receiving said fluid element therein, the coupling body comprising a sleeve portion and a tooth that extends radially inward from the sleeve portion for engaging said fluid element, and a ring configured to fit over at least one end of the coupling body for mechanically attaching the coupling body to said fluid element, wherein when the ring is installed on the at least one end of the coupling body via force with the fluid element received in the bore, the ring applies a compressive force to the coupling body sufficient to cause permanent deformation of the coupling body such that the tooth of the coupling body bites into said fluid element to thereby attach the coupling body to said fluid element in a non-leaking manner; and a sensor device affixed to a surface of the coupling body or the ring, the surface of the coupling body or ring comprising a curved portion and a substantially flat portion, wherein the sensor device comprises:

a sensor portion comprising a sensor configured for detecting a physical parameter, the sensor being affixed directly to the curved portion of the surface, a flexible circuit portion comprising a flexible circuit board and one or more circuit components supported by the flexible circuit board, and a rigid circuit portion comprising a rigid circuit board and one or more other circuit components supported by the rigid circuit board, the rigid circuit board being affixed directly to the substantially flat portion of the surface, wherein the sensor portion, flexible circuit portion, and rigid circuit portion are operatively coupled together.

* * * * *